United States Patent
Fan et al.

(10) Patent No.: US 7,596,265 B2
(45) Date of Patent: Sep. 29, 2009

(54) SEGMENTING PIXELS IN AN IMAGE BASED ON ORIENTATION-DEPENDENT ADAPTIVE THRESHOLDS

(75) Inventors: Jian Fan, San Jose, CA (US); Hui Chao, San Jose, CA (US); Luca Chiarabini, La Jolla, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 807 days.

(21) Appl. No.: 10/948,822

(22) Filed: Sep. 23, 2004

(65) Prior Publication Data

US 2006/0062454 A1    Mar. 23, 2006

(51) Int. Cl.
*G06K 9/34* (2006.01)

(52) U.S. Cl. .................. 382/164; 382/162; 382/173; 382/180

(58) Field of Classification Search .......... 382/164, 382/166, 173, 162, 180
See application file for complete search history.

(56) References Cited

U.S. PATENT DOCUMENTS

| | | | |
|---|---|---|---|
| 6,167,167 A * | 12/2000 | Matsugu et al. | 382/283 |
| 6,470,094 B1 | 10/2002 | Lienhart et al. | |
| 2003/0053686 A1 | 3/2003 | Luo et al. | |
| 2003/0072487 A1 * | 4/2003 | Fan et al. | 382/224 |
| 2003/0081836 A1 * | 5/2003 | Averbuch et al. | 382/199 |
| 2003/0099397 A1 * | 5/2003 | Matsugu et al. | 382/199 |
| 2004/0037466 A1 | 2/2004 | Gewaltig et al. | |
| 2004/0076335 A1 | 4/2004 | Kim | |
| 2004/0096122 A1 | 5/2004 | Curry et al. | |
| 2004/0130546 A1 | 7/2004 | Porikli | |
| 2005/0018893 A1 * | 1/2005 | Wang et al. | 382/173 |

OTHER PUBLICATIONS

Fan et al., Automatic Image Segmentation by Integrating Color-Edge Extraction and Seeded Region Growing, IEEE Transactions on Image Processing, vol. 10, No. 10, pp. 1454-1466.*
Jie et al., Natural Color Image Segmentation, 2003 International Conference on Image Processing, vol. 1, Sep. 14-17, pp. 973-976.*
Lim et al., Image Segmentation Using Hierarchical Meshes, 1999 International Conference on Image Processing, vol. 1, pp. 6-10.*

* cited by examiner

*Primary Examiner*—Vikkram Bali
*Assistant Examiner*—Daniel Zeilberger

(57) ABSTRACT

Methods, machines, and computer-readable media storing machine-readable instructions for segmenting pixels in an image are described. In one aspect, a region of background pixels is identified in the image. At least some of the background pixels in the region are located on a boundary spatially delimiting the region. One or more orientation-dependent adaptive thresholds are determined for one or more respective candidate growth directions from a given background pixel located on the region boundary. Color distances between the given background pixel and candidate pixels in a neighborhood of the given background pixel are determined. The region is grown based on application of the one or more orientation-dependent adaptive thresholds to the determined color distances.

39 Claims, 3 Drawing Sheets

SEGMENTING PIXELS IN AN IMAGE BASED ON ORIENTATION-DEPENDENT ADAPTIVE THRESHOLDS

BACKGROUND

Many different approaches for segmenting pixels in an image have been proposed. Among the common pixel segmentation approaches are thresholding and region growing.

Thresholding involves classifying pixels based on their respective grayscale or color values, where pixels with values below a threshold are classified into a first group and pixels with values above the threshold are classified into a second group. In some thresholding approaches a single, global threshold is used to segment pixels into the first and second groups. In other, so-called "adaptive thresholding" approaches, local thresholds are computed based on the characteristics of respective sub-regions of an image and the computed local thresholds are used to classify pixels in the corresponding image sub-regions.

Region growing is an image segmentation process that merges pixels into regions based on predefined criteria. Region growing processes typically begin with the identification of one or more "seed" regions each containing one or more seed pixels. Pixels that have characteristics similar to adjacent seed regions are merged into the adjacent seed regions in accordance with the predefined criteria. In one region growing approach, pixels are merged into adjacent seed regions when certain features of the pixels, such as color or texture, are similar enough to the adjacent seed regions to satisfy a prescribed local or global similarity constraint. The similarity constraint typically is implemented by computing measures of distances between pixels and the seed regions, and comparing the distance measures to corresponding thresholds. The similarity constraint implementation may involve the use of a single global threshold that is used to merge pixels into the seed regions. Alternatively, the similarity constraint implementation may involve the use of adaptive thresholds that are computed for particular sub-regions of a given image based on the characteristics of the sub-regions.

In general, noise reduces the accuracy with which pixels may be segmented. For example, in some thresholding approaches, a low threshold may result in a noisy background pixel being misclassified as a foreground pixel and a high threshold may result in a noisy foreground pixel being misclassified as a background pixel. The segmentation accuracy of previously proposed thresholding and region growing pixel segmentation approaches typically is insufficient for demanding applications, such as object extraction for commercial print advertising, especially in regions where the contrast between the object and the background is low.

SUMMARY

The invention features methods, machines, and computer-readable media storing machine-readable instructions for segmenting pixels in an image.

In one aspect of the invention, a region of background pixels is identified in the image. At least some of the background pixels in the region are located on a boundary spatially delimiting the region. One or more orientation-dependent adaptive thresholds are determined for one or more respective candidate growth directions from a given background pixel located on the region boundary. Color distances between the given background pixel and candidate pixels in a neighborhood of the given background pixel are determined. The region is grown based on application of the one or more orientation-dependent adaptive thresholds to the determined color distances.

The invention also features a machine and a computer-readable medium storing machine-readable instructions for implementing the above-described pixel segmentation method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The image processing embodiments described in detail below segment pixels in an image based on orientation-dependent adaptive thresholds. In this way, these embodiments are able to incorporate both spatial variation considerations and object shape considerations into the pixel segmentation process. This feature enables these embodiments to segment pixels with higher accuracy than other pixel segmentation approaches, especially near object boundaries.

Figure 1:
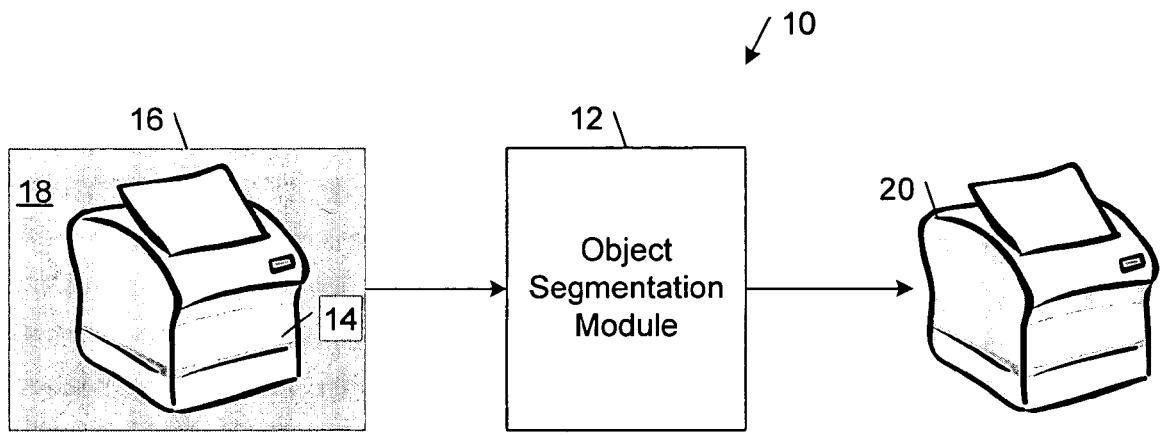
FIG. 1 is a diagrammatic view of an embodiment of an image processing system that includes an object segmentation module that is configured to segment object pixels in an image from background pixels in the image.

FIG. 1 shows an image processing system 10 that includes an object segmentation module 12 that is configured to segment pixels corresponding to an object 14 (i.e., an image of a printer) in an image 16 from pixels corresponding to a background 18 to produce an extracted object image 20. In general, the object segmentation module 12 of system 10 is not limited to any particular hardware or software configuration, but rather it may be implemented in any computing or processing environment, including in digital electronic circuitry or in computer hardware, firmware, device driver, or software. For example, in some implementations, the object segmentation module 12 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants). In addition, although full (or complete) input images are processed in the illustrated embodiments, other embodiments may be configured to sequentially process a series of sub-image portions (e.g., swaths) of an input image.

The image 16 may correspond to an original image that was captured by an image sensor (e.g., a still image or a video frame image) or a processed version of such an original image, such as a compressed, reduced-resolution version or enhanced-resolution version of an original image that was captured by an image sensor. For example, in some implementations, the image 16 is a reconstructed bitmap version of an original image that was compressed in accordance with a JEPG compression process. In the illustrated embodiment, the background pixels in the original, un-compressed image are assumed to have the same background reference color. In other implementations, these background pixels may have different colors. In general, however, the accuracy of the segmentation results is reduced if there is significant overlap between the colors of the background pixels and the colors of the object pixels.

Figure 2:
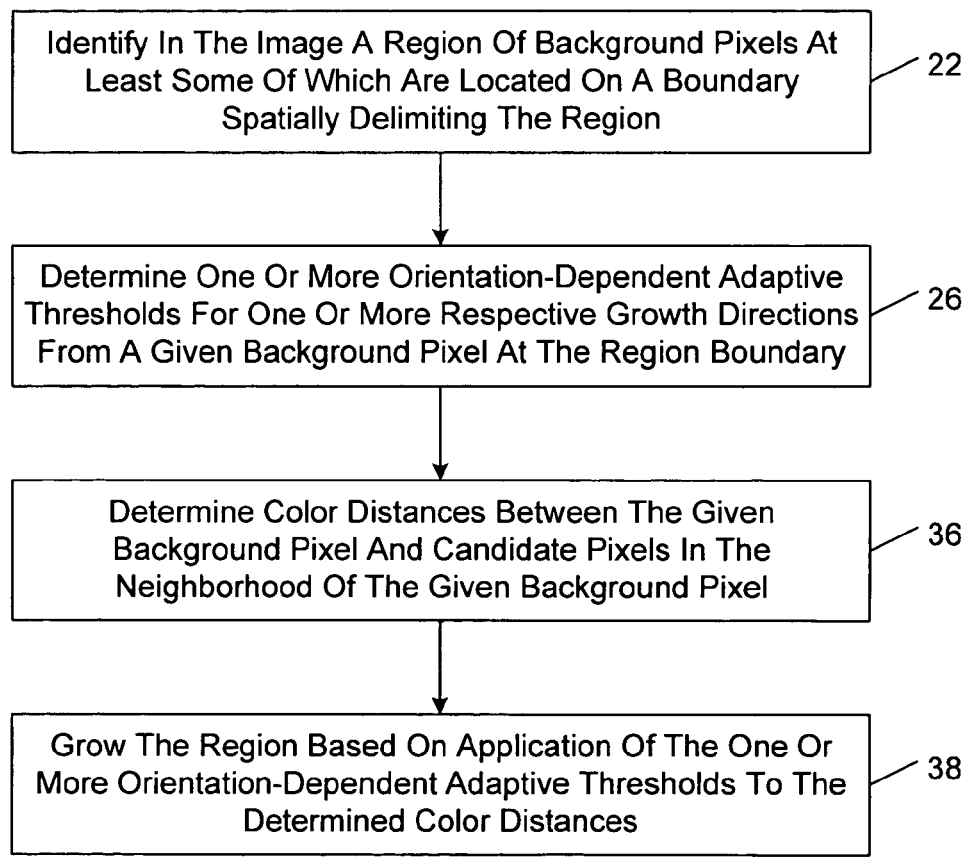
FIG. 2 is a flow diagram of an embodiment of a method of segmenting pixels in an image.

FIG. 2 shows an embodiment of a method segmenting pixels that is implemented by the image processing system 10.

In accordance with this method, a region of background pixels is identified (block 22). At least some of the background pixels in the region are located on a boundary that spatially delimits the region. In some exemplary implementations, the background pixel region is identified by a global thresholding process. In this approach, a measure of color distance between each pixel in the image 16 and the reference background color is computed. The reference background color $(r_0, g_0, b_0)$ may be provided by the user or it may be determined automatically based on an analysis of the image 16. For example, in some implementations the color of a predetermined region (e.g., the upper left corner) of the image 16 may be selected as the reference background color.

In general, any measure of color distance may be used. In one illustrative example, the color distance measure between the color $(r, g, b)$ of a given pixel in the image 16 and the reference background color $(r_0, g_0, b_0)$ is given by equation (1):

$$d = \max(|r-r_0|, |g-g_0|, |b-b_0|) \quad (1)$$

Equation (1) computes the color distance between the color of a pixel in the image and the background reference color using the infinity norm. Other exemplary measures of color distance include, for example, the L1-norm distance and the L2-norm distance.

All pixels with a color distance $d \leq D_{TH}$ are tentatively classified as background pixels, and all pixels with a color distance $d > D_{TH}$ are tentatively classified as non-background (or object or foreground) pixels. The terms "non-background pixels", "object pixels", and "foreground pixels" are used interchangeably herein. The parameter $D_{TH}$ is an empirically determined threshold. In some exemplary implementations, $D_{TH}$ is set of zero, whereby only those pixels with colors that exactly match the reference background color are classified as background pixels in the region-identification process of block 22.

Following the initial classification of the pixels of image 16 by global thresholding (block 22), an optional connectivity analysis is performed in order to correct possible misclassifications. In this process, pixels are grouped together based on their assigned classification labels and their mutual spatial proximity. Any one of a wide variety of different pixel connectivity processes may be applied to the initial classifications assigned to the pixels in image 16. For example, in one connected component labeling approach, the image 16 is converted into a binary image based on the initial pixel classification. For example, the pixels that are tentatively classified as background pixels are labeled with "1" and the pixels that are tentatively classified as non-background pixels are labeled with "0". The resulting binary image is examined, pixel-by-pixel in order to identify connected pixel regions (or "blobs", which are regions of adjacent pixels that are as assigned the same label). For each given pixel, the label assigned to the given pixel is compared to the labels assigned to the neighboring pixels. The label assigned to the given pixel is changed or unchanged based on the labels assigned to the neighboring pixels. The number of neighbors examined and the rules for determining whether to keep the originally assigned label or to re-classify the given pixel depends on the measure of connectivity being used (e.g., 4-connectivity or 8-connectivity).

After the pixel connectivity analysis has been performed, any background pixel blobs that have fewer than a threshold number of background pixels may be eliminated (i.e., reclassified as non-background pixels). In this way, the incidence of object pixels that are misclassified as background pixels may be reduced.

After the optional correction process has been performed, the boundaries between background pixel regions and non-background pixels regions may be smoothed by applying one or more morphological operations to the corrected binary image. For example, in some exemplary implementations, the morphological operations of dilation followed by erosion may be applied to background pixels in order to smooth the boundaries of the background pixel regions. In one of these embodiments, circular structuring elements with a radius of three pixels are used for the dilation process and circular structuring elements with a radius of four pixels are used for the erosion process.

Figure 3:
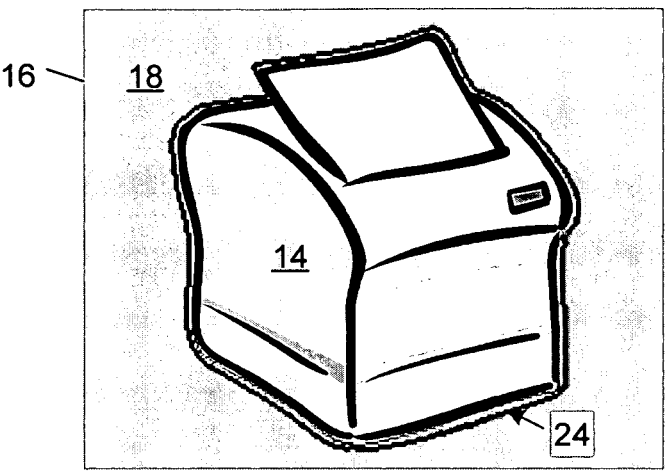
FIG. 3 is a diagrammatic view of an image after a region of background pixels has been identified in accordance with the method of FIG. 2.

FIG. 3 shows an example of the image 16 after the boundaries of the background pixel region 18 have been smoothed. In this illustrative example, the image 16 is a decompressed bitmap version of an original image that was compressed in accordance with a block transform coding compression process, such as JPEG or MPEG. The quality of an image often is degraded by a block transform coding process. For example, discontinuities often are introduced at the block boundaries in the reconstructed image and ringing artifacts often are introduced near sharp object boundaries. As a result, the global thresholding process described above is unable to reliably determine whether the noisy pixels 24 that are located near the boundaries of the object 14 are background pixels or object pixels. For this reason, the threshold $D_{TH}$ typically is set to a relatively low value (e.g., zero) so that the global thresholding process conservatively classifies background pixels. The region growing process described in detail below is used to refine the segmentation process in a way that distinguishes background pixels from object pixels with high accuracy using orientation-dependent adaptive thresholds.

Figure 4:
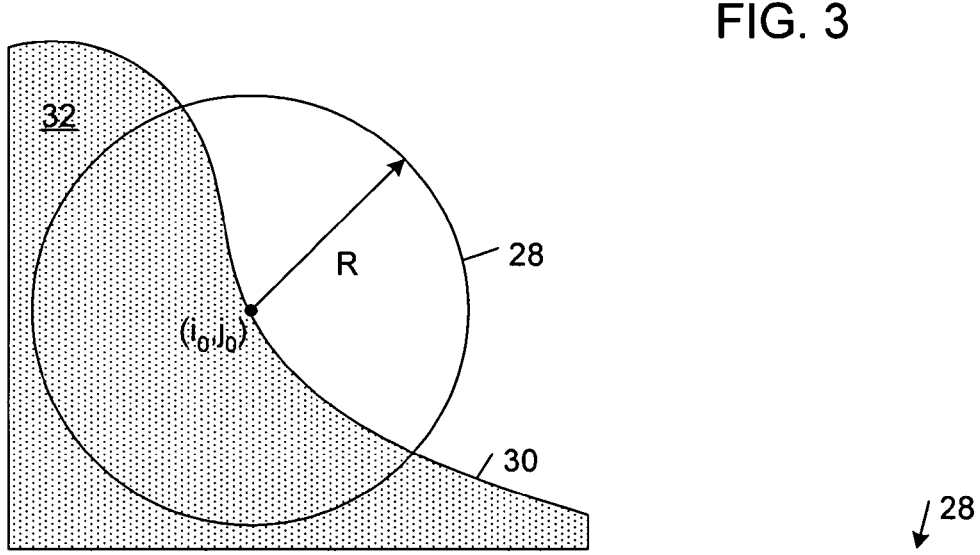
FIG. 4 is a diagrammatic view of a circular neighborhood of a given background pixel that is located on a boundary of a background pixel region.
Figure 5:
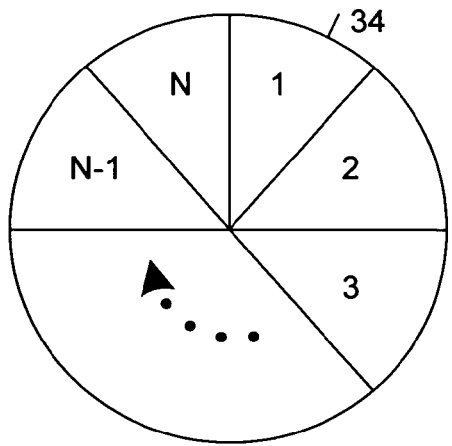
FIG. 5 is a diagrammatic view of the circular neighborhood shown in FIG. 4 divided into a set of N non-overlapping sectors.

Referring back to FIG. 2, after the boundaries of the background pixel regions have been smoothed, one or more orientation-dependent adaptive thresholds are determined for one or more respective growth directions from each of the background pixels that are located on the boundaries of the background pixel regions (block 26). The orientation-dependent adaptive thresholds may be determined on a pixel-by-pixel basis for each candidate non-background pixel under consideration. Alternatively, the orientation-dependent adaptive thresholds may be determined for groups of pixels within respective directionally-oriented regions adjacent to each given background pixel that is located on the boundary of a background pixel region. For example, FIG. 4 shows a diagrammatic view of an illustrative circular neighborhood 28 that is centered at a given background pixel $(i_0, j_0)$, which is located on a boundary 30 of a background pixel region 32. The circular neighborhood 28 has a radius R. FIG. 5 shows a diagrammatic view of the circular neighborhood 28 divided into a set of N non-overlapping sectors 34, each of which corresponds to 360/N degrees of the circular neighborhood 28 and is associated with a respective sector index n having an integer value ranging from 1 to N. Each of the sectors 34 is generally oriented along a respective candidate growth direction for the background pixel region 32.

Figure 6:
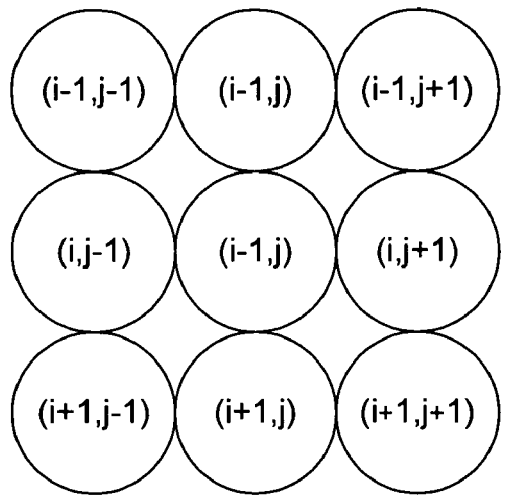
FIG. 6 is a diagrammatic view of a set of nine pixels of an image labeled with respective row and column indices.

In some implementations, the orientation-dependent adaptive thresholds are proportional to local measures of contrast representative of the various candidate growth directions. In general, any measure of local contrast may be used. In some implementations, the maximal color gradient in each sector 34 constitutes the local contrast measure for that sector. Referring to FIG. 6, in these implementations, the color gradient for a given pixel (i,j) is defined as the maximum of the horizontal color distance ($d_H$) between pixels (i,j) and (i-1,j) and the vertical color distance ($d_V$) between pixels (i,j) and (i,j-1), where the color distances ($d_H$, $d_V$) are computed in accordance with equation 1. In this process, 30 the color gradients for pixels within a given sector 34 are computed, and the maximal color gradient ($d_{MAX}$=max[$d_H$, $d_V$]) is selected as the representative color gradient for the given sector 34.

After a representative color gradient is determined for each sector 34, a threshold is computed for each sector 34 in accordance with equation (2):

$$T[n] = \begin{cases} kd_{MAX}[n], & \text{if\_kd}_{MAX}[n] < T_{MAX} \\ T_{MAX} & \text{otherwise} \end{cases} \qquad (2)$$

where k has a value in the range of 0<k<1, $d_{MAX}[n]$ is the maximum color gradient within the sector n, and $T_{MAX}$ is the maximum allowable threshold value. The parameters R, N, k, and $T_{MAX}$ may be determined empirically. In implementations in which the image 16 is reconstructed from an image compressed in accordance with a JPEG compression process based on a characteristic block size (e.g., eight pixels by eight pixels), the the neighborhood 28 is selected to be at least as large as the characteristic block size. In one exemplary implementation, R=18 pixels, N=144, k=0.25, and $T_{MAX}$=10.

Referring back to FIG. 2, after the orientation-dependent adaptive thresholds T[n] have been determined (block 26), color distances between the given background pixel and candidate pixels in the neighborhood 28 of the given background pixel ($i_0, j_0$) are determined (block 36). In general, the color distance measure may correspond to any type of measure of the color distance between the given background pixel and the candidate pixels within the sectors 34 including, for example, the L1-norm distance, the L2-norm distance, and the infinity norm distance. In some implementations, the color distance measure corresponds to the infinity norm distance measure defined in equation (1).

The background region 32 is grown based on application of the orientation-dependent adaptive thresholds T[n] to the color distances determined for the candidate pixels (block 38). In some implementations, the processes recited in blocks 36 and 38 are performed iteratively on a pixel-by-pixel basis. Candidate pixels are pixels within the neighborhood 28 that are classified as non-background (or object or foreground) pixels by any of the segmentation processes occurring prior to the initiation of block 38. In the region growing process of block 38, candidate pixels in a given sector n are added to the background pixel region 32 based on comparisons of the distances associated with the candidate pixels and the orientation-dependent adaptive thresholds T[n]. In some implementations, the region growing process proceeds incrementally from the boundaries of the background pixel region, where candidate pixels that are adjacent to the boundaries and that satisfy the threshold constraints are merged into the background pixel region 32. The boundaries of the background pixel regions change to accommodate the added candidate pixels.

In one embodiment, the growing of background regions takes places from all the boundary pixels ($i_0, j_0$). For each starting location ($i_0, j_0$), the maximum extent of the growing is limited to a disk of radial R. The results of growing all of the background regions are combined into a final segmentation map.

1. Mark the position ($i_0, j_0$) as "visited".
2. Push the position ($i_0, j_0$) into a stack s.
3. While s is not empty
4. Pop a position (i,j) from the stack s.
5. If the spatial distance between (i,j) and ($i_0, j_0$) is equal to or larger than R
6. Continue
7. End if
8. For each of possible eight neighbor pixels of (i,j) not classified as "background" and not marked as "visited"
9. Mark the position (i,j) as visited
10. Compute the color distance d between the pixel (i,j) and the pixel ($i_0, j_0$);
11. Compute the angle of the position relative to ($i_0, j_0$) and the sector index n.
12. If d<T[n]
13. Reclassify the pixel (i,j) as "grown".
14. Push the pixel position (i,j) into the stack s.
16. End if
17. End for
18. End while At the end of the background region growing process, the "grown" labels are replaced by "background" labels.

Figure 7:
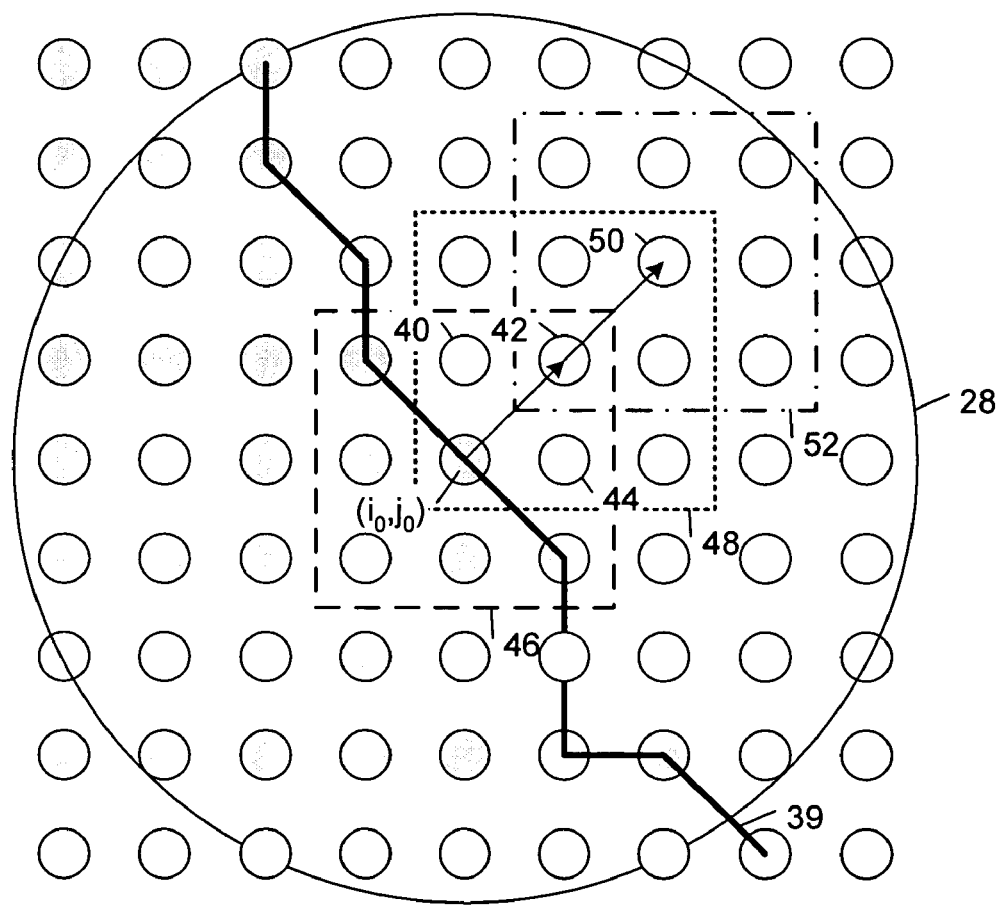
FIG. 7 is a diagrammatic view of a neighborhood of a given background pixel that is located on a boundary of a background pixel region and three nearest neighbor regions illustrating one possible growth path for the background pixel region in accordance with an implementation of the method of FIG. 2.

FIG. 7 is a diagrammatic view of a neighborhood 37 of a given background pixel ($i_0, j_0$) that is located on a boundary 39 of a background pixel region and three nearest neighbor regions 46, 48, 52 illustrating one possible growth path for the background pixel region in accordance with the above-described process. In FIG. 7, the gray-filled pixels are background pixels and the white-filled pixels are non-background pixels. The white-filled pixels within the neighborhood 37 are candidate pixels. Initially, the region growing process begins by marking the position ($i_0, j_0$) as "visited" (step 1). Next the position ($i_0, j_0$) is pushed into the stack s (step 2). The position ($i_0, j_0$) then is popped from the stack s (step 4). The distance between ($i_0, j_0$) and itself is less than R (step 5) and, therefore, each of the candidate pixels 40, 42, 44 that are within the nearest neighbor region 46 surrounding the boundary pixel ($i_0, j_0$) are considered (step 8). Each of the candidate pixels 40-44 is marked as visited (step 9). The color distances between the candidate pixels 40-44 and the pixel ($i_0, j_0$) are computed (Step 10). The angles of the candidate pixels 40-44 relative to the pixel ($i_0, j_0$) are computed (e.g., 90°, 45°, and 0°), and the computed angles are used to determine the sector index value for each of the candidate pixels 40-44 (step 11). For illustrative purposes, it is assumed that the index values are n=1, 2, and 3 for pixels 40, 42, and 44, respectively. If any of the computed color distances are less than the respective orientation-dependent adaptive thresholds T[1], T[2], T[3] (step 12), the corresponding ones of the candidate pixels 40-44 are reclassified as "grown" (step 13) and are pushed into the stack s (step 14).

The steps 3-17 are repeated for all "grown" pixels in the stack until the stack is empty. For example, assuming that pixel 42 is a pixel popped out of the stack, the steps 3-17 are repeated for pixel 42 by considering the pixels within the nearest neighbor region 48. Subsequently, assuming that pixel 50 is similar in color to pixel 42 by the orientation-dependent adaptive threshold, the steps 3-17 are repeated for pixel 50 by considering the pixels within the nearest neighbor region 52.

Other embodiments are within the scope of the claims.

The embodiments are described above in connection with the image 16, which contains a single discrete object (i.e., an image of a printer). These embodiments, however, readily may be applied to images containing multiple discrete objects.

The systems and methods described herein are not limited to any particular hardware or software configuration, but rather they may be implemented in any computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

What is claimed is:

1. A method of segmenting pixels in an input image, comprising operating a computer processor to perform operations comprising:
   identifying in the input image a region of background pixels at least some of which are located on a boundary spatially delimiting the region;
   determining orientation-dependent adaptive thresholds for respective candidate growth directions from a given background pixel located on the region boundary;
   determining color distances between the given background pixel and candidate pixels in a neighborhood of the given background pixel;
   for each of the candidate pixels,
      associating the candidate pixel with a respective one of the orientation-dependent adaptive thresholds based on the orientation of the candidate pixel in relation to the given background pixel and
      growing the region to include the candidate pixel based on application of the associated orientation-dependent adaptive threshold to the determined color distance between the candidate pixel and the given background pixel; and
   producing an output image, wherein the producing comprises extracting at least one object from the input image based on the grown region.

2. The method of claim 1, wherein identifying the region comprises classifying pixels as background pixels based on a global threshold.

3. The method of claim 2, wherein identifying the region comprises determining color distances between colors of pixels in the input image and at least one reference background color, and classifying pixels as background pixels based on comparisons between the color distances and the global threshold.

4. The method of claim 2, wherein identifying the region comprises grouping pixels classified as background pixels based on their mutual spatial proximity.

5. The method of claim 2, wherein identifying the region comprises smoothing the boundary.

6. The method of claim 1, wherein determining the one or more orientation-dependent adaptive thresholds comprises dividing the neighborhood into a set of directionally oriented sub-regions adjacent to the given background pixel, and determining a respective one of the orientation-dependent adaptive thresholds for each of the sub-regions.

7. The method of claim 6, wherein the neighborhood comprises a circular region of the input image centered at the given boundary pixel, and the sub-regions are non-overlapping sectors of the circular region.

8. The method of claim 6, wherein determining the one or more orientation-dependent adaptive thresholds comprises determining a representative color gradient for each sub-region.

9. The method of claim 8, wherein determining each color gradient comprises determining a respective maximal color gradient in each corresponding sub-region.

10. The method of claim 8, wherein the one or more orientation-dependent adaptive thresholds are proportional to respective ones of the representative color gradients.

11. The method of claim 10, wherein the one or more orientation-dependent adaptive thresholds are proportional to respective ones of the representative color gradients up to a maximum threshold.

12. The method of claim 1, wherein growing the region comprises adding to the region candidate pixels adjacent to background pixels located on the boundary based on comparisons between distances associated with the candidate pixels and respective ones of the orientation-dependent adaptive thresholds.

13. The method of claim 12, wherein growing the region further comprises adding to the region candidate pixels adjacent to pixels added to the region based on comparisons between distances associated with the candidate pixels and respective ones of the orientation-dependent adaptive thresholds.

14. The method of claim 1, further comprising smoothing the boundary of the grown region.

15. The method of claim 1, wherein the input image is compressed in accordance with a block transform coding process based on a characteristic block size, and the neighborhood is at least as large as the characteristic block size.

16. A machine for processing an input image, comprising at least one data processing module configured to perform operations comprising:
   identifying in the image a region of background pixels at least some of which are located on a boundary spatially delimiting the region;
   determining orientation-dependent adaptive thresholds for respective candidate growth directions from a given background pixel located on the region boundary;
   determining color distances between the given background pixel and candidate pixels in a neighborhood of the given background pixel; and
   for each of the candidate pixels, associating the candidate pixel with a respective one of the orientation-dependent adaptive thresholds based on the orientation of the candidate pixel in relation to the given background pixel and growing the region to include the candidate pixel based on application of the associated orientation-dependent adaptive threshold to the determined color distance between the candidate pixel and the given background pixel.

17. The machine of claim 16, wherein the at least one data processing module classifies pixels as background pixels based on a global threshold.

18. The machine of claim 17, wherein the at least one data processing module determines color distances between colors of pixels in the image and at least one reference background color, and classifies pixels as background pixels based on comparisons between the color distances and the global threshold.

19. The machine of claim 17, wherein the at least one data processing module groups pixels classified as background pixels based on their mutual spatial proximity.

20. The machine of claim 17, wherein the at least one data processing module smoothes the boundary.

21. The machine of claim 16, wherein the at least one data processing module divides the neighborhood into a set of directionally oriented sub-regions adjacent to the given background pixel, and determining a respective one of the orientation-dependent adaptive thresholds for each of the sub-regions.

22. The machine of claim 21, wherein the neighborhood comprises a circular region of the image centered at the given boundary pixel, and the sub-regions are non-overlapping sectors of the circular region.

23. The machine of claim 21, wherein the at least one data processing module determines a representative color gradient for each sub-region.

24. The machine of claim 23, wherein the at least one data processing module determines a respective maximal color gradient in each corresponding sub-region.

25. The machine of claim 23, wherein the one or more orientation-dependent adaptive thresholds are proportional to respective ones of the representative color gradients.

26. The machine of claim 25, wherein the one or more orientation-dependent adaptive thresholds are proportional to respective ones of the representative color gradients up to a maximum threshold.

27. The machine of claim 16, wherein the at least one data processing module adds to the region candidate pixels adjacent to background pixels located on the boundary based on comparisons between distances associated with the candidate pixels and respective ones of the orientation-dependent adaptive thresholds.

28. The machine of claim 27, wherein the at least one data processing module adds to the region candidate pixels adjacent to pixels added to the region based on comparisons between distances associated with the candidate pixels and respective ones of the orientation-dependent adaptive thresholds.

29. The machine of claim 16, wherein the at least one data processing module smoothes the boundary of the grown region.

30. The machine of claim 16, wherein the image is compressed in accordance with a block transform coding process based on a characteristic block size, and the neighborhood is at least as large as the characteristic block size.

31. A machine-readable medium storing machine-readable instructions for causing a machine to perform operations comprising:
identifying in an image a region of background pixels at least some of which are located on a boundary spatially delimiting the region;
determining orientation-dependent adaptive thresholds for respective candidate growth directions from a given background pixel located on the region boundary;
determining color distances between the given background pixel and candidate pixels in a neighborhood of the given background pixel; and
for each of the candidate pixels,
associating the candidate pixel with a respective one of the orientation-dependent adaptive thresholds based on the orientation of the candidate pixel in relation to the given background pixel and
growing the region to include the candidate pixel based on application of the associated orientation-dependent adaptive threshold to the determined color distance between the candidate pixel and the given background pixel.

32. The machine-readable medium of claim 31, wherein the machine-readable instructions cause the machine to classify pixels as background pixels based on a global threshold.

33. The machine-readable medium of claim 31, wherein the machine-readable instructions cause the machine to divide the neighborhood into a set of directionally oriented sub-regions adjacent to the given background pixel, and determining a respective one of the orientation-dependent adaptive thresholds for each of the sub-regions.

34. The machine-readable medium of claim 33, wherein the neighborhood comprises a circular region of the image centered at the given boundary pixel, and the sub-regions are non-overlapping sectors of the circular region.

35. The machine-readable medium of claim 33, wherein the machine-readable instructions cause the machine to determine a representative color gradient for each sub-region.

36. The machine-readable medium of claim 35, wherein the machine-readable instructions cause the machine to determine a respective maximal color gradient in each corresponding sub-region.

37. The machine-readable medium of claim 31, wherein the machine-readable instructions cause the machine to add to the region candidate pixels adjacent to background pixels located on the boundary based on comparisons between distances associated with the candidate pixels and respective ones of the orientation-dependent adaptive thresholds.

38. The machine-readable medium of claim 37, wherein the machine-readable instructions cause the machine to add to the region candidate pixels adjacent to pixels added to the region based on comparisons between distances associated with the candidate pixels and respective ones of the orientation-dependent adaptive thresholds.

39. The method of claim 1, wherein the determining of one or more orientation-dependent adaptive thresholds comprises determining a respective orientation-dependent adaptive threshold for each of multiple ones of the candidate growth directions from the given background pixel located on the region boundary.

* * * * *